United States Patent [19]
Allison et al.

[11] Patent Number: 5,517,193
[45] Date of Patent: May 14, 1996

[54] METEOROLOGICAL WORKSTATION

[75] Inventors: Clifford L. Allison, Clifton, Va.; Duane T. Cookson, Gaithersburg, Md.

[73] Assignee: International Business Machines Corporation, Armonk, N.Y.

[21] Appl. No.: 56,198

[22] Filed: Apr. 30, 1993

[51] Int. Cl.⁶ ........................................ G01S 13/95
[52] U.S. Cl. ............................... 342/26; 364/420
[58] Field of Search ........................ 342/26; 364/420

[56] References Cited

U.S. PATENT DOCUMENTS

| | | | |
|---|---|---|---|
| 3,537,096 | 10/1970 | Hatfield | 178/6 |
| 3,745,571 | 7/1973 | Chwastyk et al. | 342/194 |
| 4,163,216 | 7/1979 | Arpino | 340/152 R |
| 4,173,017 | 10/1979 | Burlage et al. | 342/162 |
| 4,287,762 | 9/1981 | Baer | 73/170 R |
| 4,295,139 | 10/1981 | Arpino | 340/870.01 |
| 4,388,683 | 6/1983 | Beifuss et al. | 364/200 |
| 4,445,214 | 4/1984 | Reynolds et al. | 370/94 |
| 4,519,029 | 5/1985 | Thompson | 364/200 |
| 4,521,857 | 6/1985 | Reynolds | 364/439 |
| 4,706,198 | 11/1987 | Thurman | 364/439 |
| 4,714,989 | 12/1987 | Billings | 364/200 |
| 4,862,154 | 8/1989 | Gonzalez-Lopez | 340/747 |
| 5,019,977 | 5/1991 | LaPointe et al. | 364/420 |
| 5,119,470 | 6/1992 | Highland et al. | 395/64 |
| 5,124,915 | 6/1992 | Krenzel | 364/200 |
| 5,129,063 | 7/1992 | Sainola et al. | 395/275 |
| 5,136,690 | 8/1992 | Becker et al. | 395/161 |
| 5,204,965 | 4/1993 | Guthery et al. | 395/800 |
| 5,210,789 | 5/1993 | Jeffus et al. | 379/127 |
| 5,247,614 | 9/1993 | Eagen et al. | 395/200 |
| 5,253,359 | 10/1993 | Spix et al. | 395/575 |
| 5,296,854 | 3/1994 | Hamilton et al. | 340/980 |
| 5,303,344 | 4/1994 | Yokoyama et al. | 395/200 |
| 5,309,355 | 5/1994 | Lockwood | 364/401 |
| 5,339,439 | 8/1994 | Latimer et al. | 395/275 |
| 5,361,385 | 11/1994 | Bakalash | 395/124 |
| 5,363,107 | 11/1994 | Gertz et al. | 342/26 |
| 5,363,475 | 11/1994 | Baker et al. | 395/122 |
| 5,414,644 | 5/1995 | Seaman et al. | 364/551.01 |

OTHER PUBLICATIONS

Oceans 84 Conference Record, vol. 1, Sep. 10, 1984, pp. 502–505.

Sparks & Sumner, "Micros in Control—On–Line Weather Data Acquisition Using a BBC Microcomputer", pp. 212–218 (Publication uknown).

Radio Electronics, Mar. 1988, R–E, "Technology Marketing Inc. PC Weather Pro", pp. 23–25, 42.

IBM Technical Disclosure Bulletin, vol. 22 No. 2, Jul. 1979, C. F. Monette, "Semi–Automatic Aviation Weather System", pp. 668–669.

*Primary Examiner*—John B. Sotomayor
*Attorney, Agent, or Firm*—Whitham, Curtis, Whitham & McGinn; John D. Flynn

[57] ABSTRACT

A meteorological workstation provides for editing of raw data at its input by providing intelligent control of extraction of data from one or more data streams of collected weather data. Commands by the operator to the graphics processing of a weather forecasting and numerical modelling application cause the generation of commands to a dedicated processor controlling acceptance or extraction of data. Thus, data to be processed is limited, at any given time, to the data actually needed by the meteorological workstation under user control and has the effect of allowing the workstation user to control the source of the data being collected. Intelligent direction of the selected data also allows the formation of messages and the issuance of advisories and warnings even when the workstation is unattended.

24 Claims, 6 Drawing Sheets

METEOROLOGICAL WORKSTATION

BACKGROUND OF THE INVENTION

Field of the Invention

The present invention generally relates to data processing workstations and, more particularly, to workstations for performing analyses and reports concerning meteorological and/or hydrological data.

Description of the Prior Art

Meteorological and hydrological information is of vital importance to many individuals and industries throughout the world; agriculture and aviation being particularly evident examples. Additionally, the accurate and timely distribution of such information to the public may allow individuals or organizations to avoid potentially catastrophic damage due to weather and water conditions.

Especially in recent years, numerous atmospheric phenomena have been detected, observed and modelled, such as highly dangerous and destructive "micro bursts", which were previously unobserved or dismissed as anomalous but have recently been determined to have caused several aircraft crashes and damage to building structures. Such detection, observation and modelling has been made possible through recent improvements in atmospheric observation technology, such as Doppler radar which has the capacity to observe wind shear.

This technical capability and the potential benefits in avoiding loss of life or property has resulted in a worldwide upgrade of meteorological data gathering facilities. This, in turn, has resulted in a proliferation of data to be analyzed in order to provide prediction of weather from current conditions and historical precedent. Facilities for collection and communication of meteorological and hydrological information exist and are readily accessible through several commercial services such as from satellite image services, individual radar installations, the National Weather Service radar mosaic, networks of local weather stations (each station providing a so-called "station profile" including temperature, precipitation, barometric pressure, wind speed and direction, etc.), and the like. Each of these services, at the present time, provides for data collection and downloading to a database, processing of the data, and transmission of the processed data at predetermined intervals (e.g. each half hour) for large areas of the world such as a hemisphere in satellite imagery or the entirety of North America in radar mosaics.

Further, while the recent improvements in meteorological observation technology has provided a substantial increase in the amount of data which may be accessed, the processing time has been increased and the timeliness of data reporting has been degraded. As an example of the volume of data involved, a single geosynchronous satellite may provide with each image, 24 Megabytes of image data for the visual spectrum and each of seven infrared wavelengths. This information may also be supplied as time lapse automation sequences which further increases the volume of data to be processed locally. Such systems are also highly automated and do not ordinarily provide any analysis or suppression of anomalous information.

From the point of view of the meteorologist, such proliferation of information, while of improved quality, detail and comprehensiveness, is highly inconvenient. First, the data relevant to a particular locality is difficult to extract from commercially provided reports and requires large local memory. Second, the meteorologist has no control of the processing which may be performed by the service and the data upon which he or she may base their analysis is essentially "second-hand". Third, the time involved in the analysis by commercial or public services not only reduces the timeliness of the data but may lead to erroneous conclusions since the data from the different services will usually reflect conditions at different observation times. Fourth, the meteorologist has no ability to automate local forecasting because the automated processing of data done by the reporting services requires assimilation by trained personnel for evaluation of erroneous or anomalous data, particularly due to the asynchronous nature of the data from plural services. Fifth, the integration of local observations with data from services also requires the expertise of meteorologists familiar with local weather patterns and is difficult for many of the same reasons discussed above as to the timing of observations and lack of local control over data processing performed by services. Sixth, raw data is effectively hidden from the meteorologist, tending to reduce the scientific integrity of the analyses which the meteorologist performs and the reports which the meteorologist prepares.

SUMMARY OF THE INVENTION

It is therefore an object of the present invention to provide a meteorological workstation capable of performing editing of raw data from a plurality of sources in essentially real time.

It is another object of the present invention to provide a meteorological workstation which will permit accurate automated production of forecasting reports and bulletins.

It is a further object of the present invention to provide a meteorological workstation which provides for the production of color maps and contour displays directly from selected raw data while overlaying alphanumeric legends messages and graphic patterns thereon.

It is another further object of the invention to provide a meteorological workstation which can exercise control over data sources.

It is a yet further object of the invention to provide a meteorological workstation in which an operator may selectively remove anomalous or erroneous data in the course of analysis.

In order to accomplish these and other objects of the invention, a workstation is provided for analysis and manipulation of data, including graphical data, from at least one source in response to user input, including a workstation processor for executing commands in response to user input for manipulating the data, and an arrangement for supplying data to the workstation processor including a communication interface receiving data from the source, and an autonomously operating processor for maintaining a specification of data requested by the workstation processor and controlling extraction of data from data received by said communication adapter for supply to the workstation processor.

In accordance with another aspect of the invention, a method of operating a workstation having a workstation processor, is provided including the steps of transmitting data to a communication interface and storing the data therein, controlling an autonomous processor from the workstation processor to maintain a specification of data of interest, extracting data of interest within the data stored at the communication interface in accordance with the specification, and applying the extracted data to said workstation processor.

In accordance with a further aspect of the invention, a communications interface is provided including an arrangement for receiving and storing data from the source, an autonomously operating processor means for maintaining a specification of data within the data from the source and means for extracting data from data received by the communication interface in accordance with specification of data of interest.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
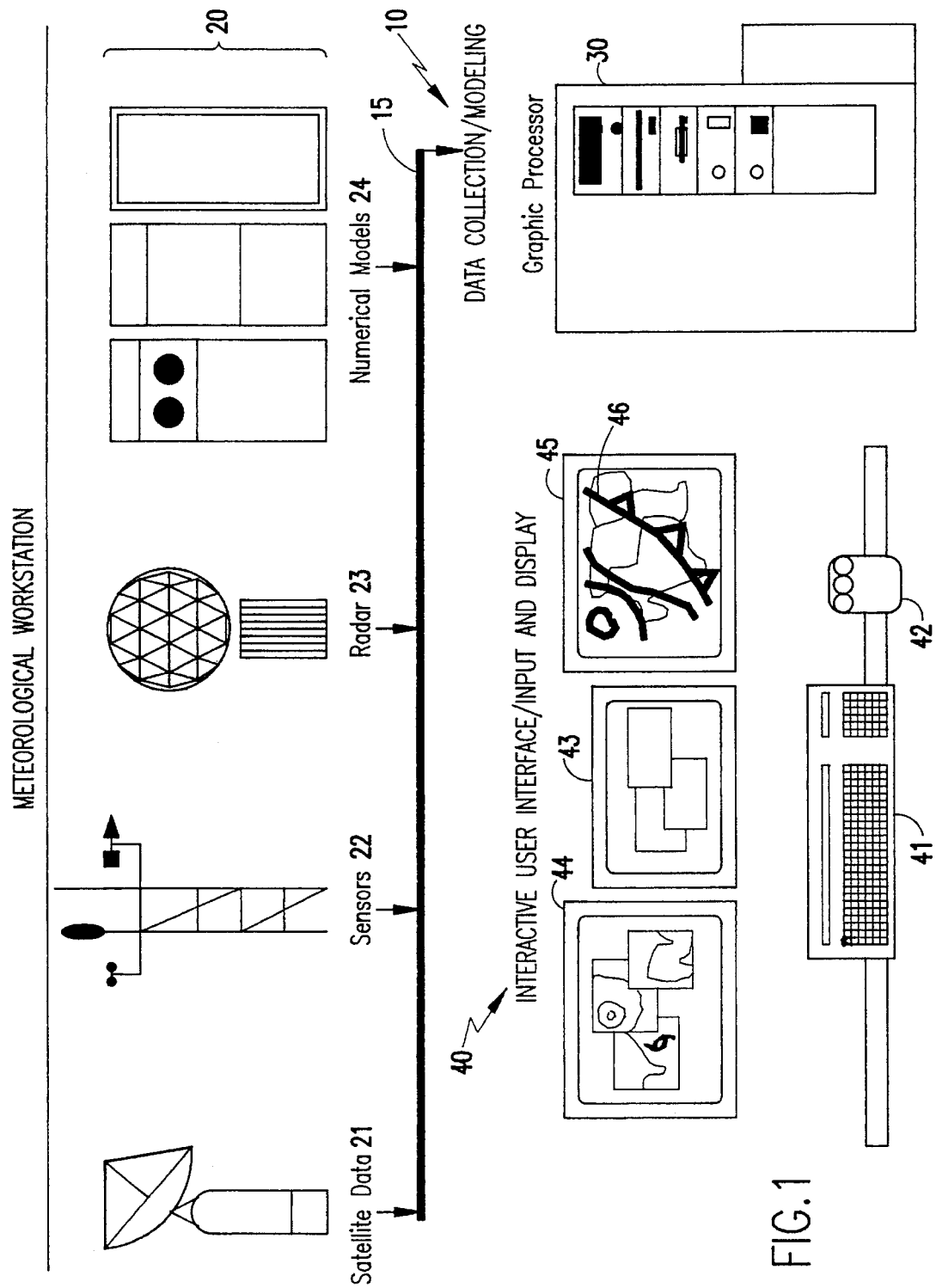
FIG. 1 illustrates the major elements of the user interface provided by the meteorological workstation in accordance with the invention.

Referring now to the drawings, and more particularly to FIG. 1, there is shown an overview of the major elements of the meteorological workstation 10 in its preferred form. The meteorological workstation 10 is preferably housed principally within a console-type enclosure, the exact form of which is unimportant to the practice of the invention. The meteorological workstation 10 receives input as raw data from a plurality of sources 20 over data bus 15. Such sources preferably include a satellite communication receiver 21, ground-based sensors 22, at least some of which are preferably local, radar 23, and one or more locally or remotely stored databases containing numerical models of historical data 24.

The workstation itself includes a graphics processor 30 which is, itself, well known in the art, and a user interface 40 which preferably includes a plurality of user input devices for both alphanumeric (e.g. a keyboard 41) and graphical (e.g. mouse 42, trackball, light pen or the like) inputs. The user interface 40 also preferably includes three display screens 43, 44, 45, which are preferably color cathode-ray tube (CRT) displays of relatively high resolution (e.g. 1280×1024 pixels) for presentation of display screens and windows developed by the graphics processor 30. However, the number of displays on the workstation is limited only by the capabilities of the image/graphics engine. The three displays serve somewhat different functions and preferably will be provided with different images in a user-defined manner. For example, the center display 43 may be used for display of menus of control functions in overlaid windows, pull-down menus, icons or condensed images as sprites or windows or combinations thereof to thus serve as a supplementary input device in connection with the keyboard 41 and mouse 42. This display is typically multi-window and has the capability to view textual, tabular and reporting information as well as execute workstation programs that perform compilation, word processing, graphics, and report formation. This display is a minimum of 1280×1024, monochrome or color with color preferred, and driven by the low end capabilities of the image/graphics engine. The two remaining displays are used for weather imagery display and analysis.

The left display 44 may be used to display graphical images developed by the graphics processor in overlaid windows for selection or other manipulation (e.g. superposition, definition of pseudo-colors, etc.) and the right display 45 may be used for full size display of a selected window of the left display 44 for direct manipulation by the operator (e.g. adding a "cold front" symbol 46 thereto by drawing thereon by a mouse or light pen). In this regard, the mouse 42 or other graphical input may control one or more cursors on any screen and which may be linked between screens (e.g. a cursor on the right screen 45 may follow a cursor on the left screen as it traverses a corresponding window displayed thereon. All of these manipulations are well-understood in the art and readily available in many graphics software applications, as well as in hardware implementations. By the same token, none are critical to the practice of the invention and the meteorological workstation can thus be readily customized to provide any type of graphics processing otherwise available or which may become available in the art.

Figure 2:
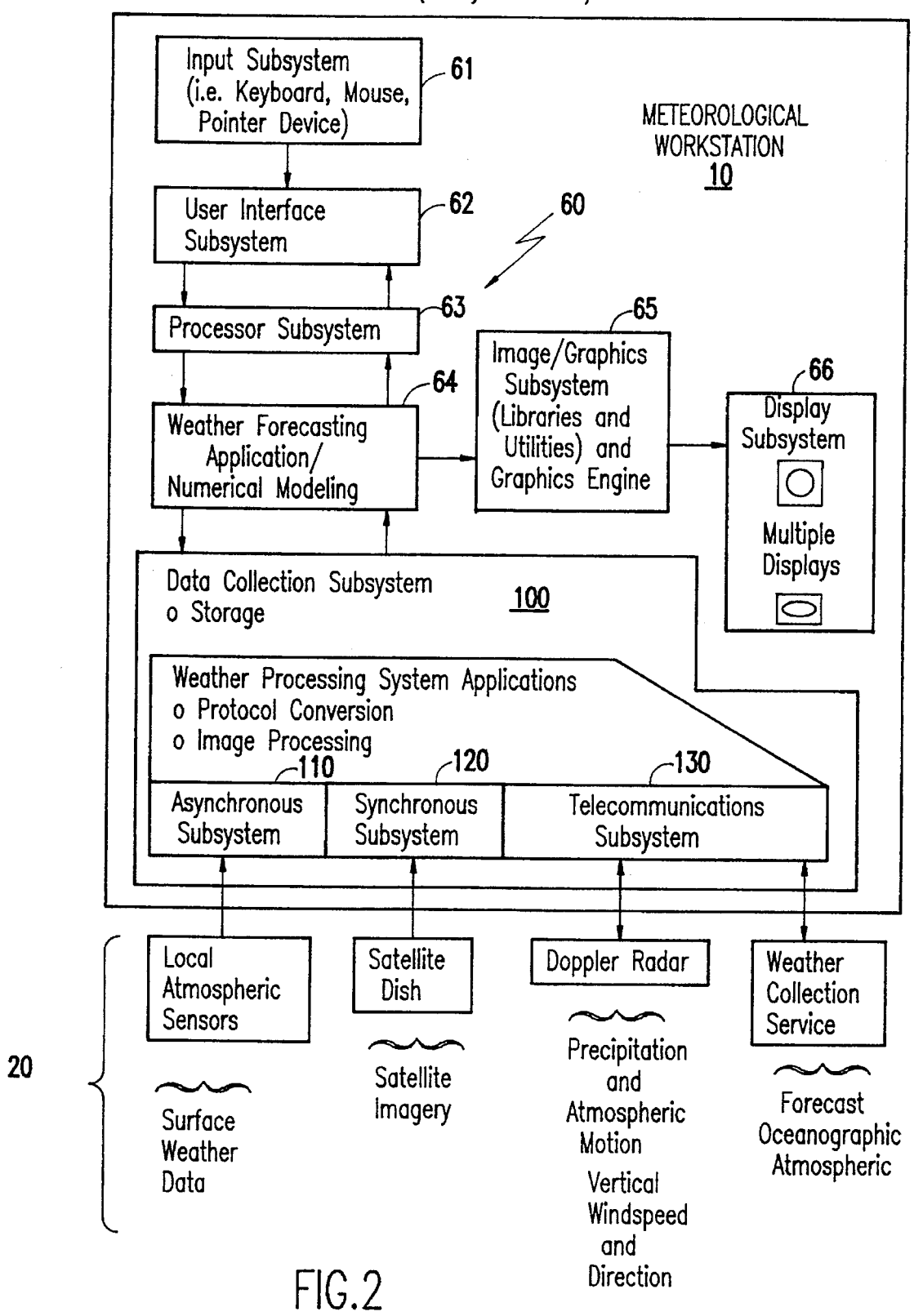
FIG. 2 is a schematic representation of the architecture of the meteorological workstation in accordance with the present invention.

In order to more readily appreciate the integration of the meteorological workstation in accordance with the invention, FIG. 2 illustrates the workstation architecture on the subsystem level. The meritorious effects of the present invention are principally supported by the data collection subsystem 100 which includes a plurality of system applications and communications subsystems which will be described in greater detail below. The remainder of the subsystems of the preferred embodiment of the meteorological workstation may generally be regarded as peripheral thereto and falling within two groups: the data source group 20, illustrated in the lower portion of FIG. 2 and briefly described above, and the user interface and display generation group 60 of subsystems illustrated in the upper portion of FIG. 2.

The user interface group 60 includes an input subsystem 61 which provides the capability for the Meteorologist to operate and interact with the Meteorological Workstation. This subsystem preferably includes a workstation keyboard device for keyboard entry and a pointer device, such as a mouse, joystick, trackball or spaceball, to interact with the user interface of the graphics applications used to process meteorological data input to the meteorological workstation. The Meteorologist uses the keyboard to enter alphanumeric information into the workstation. For example, the keyboard would be used to actually type a weather forecast or used to enter parameter data that is captured by the meteorological applications software to indicate the analysis ranges of a modelling program. Pointing devices are used for the Meteorologist to "point" to objects or directly draw graphic lines on the display. This pointing indication is interpreted by the display applications and acted upon. For example, in a typical windowing environment, the pointer is used to make a window active and select information in the active window. Additionally, the pointer is used in image manipulation scenarios when the meteorologist wishes to manually clip image data or select regions for zooming and panning.

The user interface subsystem 62 provides the capability to receive and process the Meteorologist inputs as provided by the Input Subsystem. This subsystem is responsible for the "look and feel" of the Meteorological Workstation. Since there are no established standards for the "look and feel" of weather information systems, these systems must be made capable of being readily customized to specific user requirements and allow for a variety of future systems changes. User interface systems such as various window interface applications and object oriented interfaces provide consistent generic user interfaces that are readily developed, easily maintained, and modifiable for the user and weather applications developer.

These user interface systems provide the means by which the operator interacts with the workstation. Preferably, the "look and feel" will provide multiple windows and menupull down capabilities and support an extensive range of colors for improved screen definition and clarity. Additionally, this system will support customizing of the desktop by the Meteorologist, including the ability to move and drag windows, to reflect individual preferences for personal ease of use. These features of the meteorological workstation are not at all critical to the practice of the invention.

The processor subsystem 63 provides the workstation processing and CPU performance throughput for the system. This subsystem will generally consist of specialized Reduced Instruction Set Computer (i.e. RISC) processor chip sets which are currently available and provide enhanced execution speed for data processing operations. The processor subsystem 63 is therefore a key determinant in overall workstation systems performance but is not critical to the practice of the principles of the invention.

To rapidly perform the numerically intensive calculations and operations that are required of a meteorological workstation, the actual processors of the processing subsystem must be utilized a high percentage of the time. As a result, cache memory with anticipatory data prefetching is preferably provided between the CPU of processor 63 and memory to avoid the requirement of a full memory access cycle time when the application 64 calls for a fetch of data, in a manner well-understood in the art, for decreasing the idle-time of the system processors. Also, cache memory capacity should be relatively large to reduce the amount of mass memory (e.g. hard drive) accesses and memory swapping (i.e. paging), as well as to facilitate the transfer of image data from the hard drive to the image/graphics subsystem.

The weather forecasting application and numerical modeling subsystem 64 provides the weather forecasting and analysis functions for the meteorological workstation. This subsystem is responsible for providing all the programs and algorithms for analysis and processing of the collected weather information from the data collection subsystem 100. This subsystem additionally provides the very complex analysis and processing algorithms required for numerical modeling which are available in the industry. These algorithms serve as tools to assist the Meteorologist to assess long-term trends, formulate and test weather models, provide predictive behavior analysis of the weather based on past events and combine real time data that has been collected from the directly attached weather collection devices to, for example, predict the path of a storm or tornado.

Also, this subsystem 64 provides the applications software to support the image/graphics functionality required of the meteorological workstation. This applications software, which may be a group of individual applications, provides the architecture and structures the scenarios for the Meteorologist to communicate with the meteorological workstation through the input subsystem 61 and user interface subsystem 62 and view the results of the interactions on the workstation displays. These applications provide calls to the Image/Graphics Subsystem 65.

The image/graphics subsystem 65 provides the image/graphics libraries and utilities that are called by means of the weather forecasting application and numerical modeling subsystem 64. The image and graphics commands from weather forecasting application 64 are processed by means of the meteorological workstation's image/graphics engine. This engine issues the analog display signals to the workstation displays of the display subsystem 66 and serves to perform image manipulations under user control.

The image/graphics engine (or engines, operating generally in parallel) supports the meteorological workstation's system requirement to simultaneously display animation loops including full screen image zoom. Image/graphics engines should provide the capability to simultaneously display approximately 32 frame animation loops including image zoom at a rate of 10 frames per second. Ten frames per second is recognized as the minimum workstation systems requirement for "flicker free" animation and acceptably smooth image motion.

An image frame based on meteorological data developed by the graphics engine preferably comprises a (512×512) 256 KB, 8 bit per pixel image when zoomed to full screen size and displayed. This will be displayed as either an 8 bit greyscale or color image, requiring a total of 256 shades or colors for the image. Next, a vector graphics representation of the corresponding regional area map background is overlaid on the image. Additionally, the capability to overlay 3 additional graphics is preferred. These would typically provide information such as wind speed, pressure and dew point along varying bands of the region and each overlay would be a different color selectable from a color palette reserved specifically for the graphics overlays (i.e. independent of the image palette).

The graphics engine should also preferably support display of weather frames in a non-animated multi-window environment that does not require full screen zoom. Each display requires a multi-window capability of up to eight windows, and color independence is preferably maintained in a minimum of four of the eight windows. That is, if the color palette of the image or graphics were to be changed in one window, the colors in three of the other windows would not be affected. This capability is important for the Meteorologists to interact with the displays to conform or differentiate data from discrete data sources (radar and satellite images, in particular) in, for example, formulation of "what if" analyses and correlation or differentiation of weather trends among the windowed image/graphics representations across the workstation displays. Additionally, the image/graphics engine preferably supports an additional palette of seven colors, for display of character information, and support of a user interface (e.g. menus) for image/graphics operations that occur on the display.

The manipulations controlled from the user interface subsystem 62 in response to user input may include, but are not limited to, image data correlation, such as the development of isothermal or isobaric contours, overlaying or mixing of images, pseudocolor, zoom and pan, and image extraction from memory for such purposes as animation of short sequences of image frames or comparison with historical/archival image data. For this purpose, imaging applications software libraries and utilities within the image/graphics subsystem 65 provide a software imaging command set to the user which may be more or less specific to the type of data manipulations desired or required by meteorological of other types of data. (In this regard, it should be understood that the principles of the invention are not limited to meteorological data and could be applied to any data base. However, the invention is particularly applicable to operations on the high volume of rapidly changing and unsynchronized data presently characteristic of and unique to meteorological data.) This command set may be supported under the user interface subsystem 62 using the above-mentioned types of window and/or object oriented interface. Often, the image/graphics commands are sent to the image/graphics engine hardware adapter for processing in a FIFO fashion. Several readily available mid-level software interfaces provide high performance and functionality for weather image processing. Vendors of these software interfaces implement portions of the command set in both software and hardware; reserving hardware implementation ("assists") for functions that require high performance optimization.

The desired capability of simultaneous animation and zoom on two displays presents substantial image processing difficulties. Commercially available solutions either share the memory and databus between the workstation processor and the image processor (e.g. graphics engine) or allow independent execution using independent databuses and/or memory. However, in accordance with one embodiment of the invention, a separate databus is allocated to the image processor and image frame memory sufficient to hold two frames (referred to as double buffering) is provided for each display. Additional off-screen memory is preferably provided in the graphics engine sufficient to contain approximately thirty-two image frames. This off-screen memory, in combination with a separate databus and the double buffered screen image memory, allows ease of production of animated sequences of complete image frames without intervention by processor subsystem 63. Similar results can also be obtained in a more hardware efficient manner by sharing the memory and databus between the image processor and the workstation processor, at least for a single task environment.

The above subsystems 61–66 can be considered as a unit within the present invention which is centered about the weather forecasting application/numerical modelling subsystem 64; the application receiving data from the data collection subsystem 100, user input from the input subsystem 61 and the user interface subsystem 62 through the meteorological workstation processor subsystem 63, and outputting image control commands and data to the image/graphics subsystem 65 which contains the graphics engine for ultimately producing an image on the multiple displays 66.

The data input group 20, while preferably connected physically to the meteorological workstation through input bus 15, as shown in FIG. 1, is operationally divided into three sub-groups in dependence on the mode of communication with a particular meteorological workstation in accordance with the invention rather than by the type or content of data provided. These sub-groups are thus referred to as an asynchronous group or subsystem 110, a synchronous group or subsystem 120 and a telecommunications group or subsystem 130. These three groups thus form a data input to the data collection subsystem 100 and form an interface to data sources which provide data in three distinct formats. The data collection subsystem, then, communicating with the weather forecasting and numerical modelling subsystem 64, thus becomes central to the meteorological workstation and provides the editing of raw data and other advantages of the present invention in a manner which will now be described in detail for each of the input groups 110, 120 and 130.

Figure 3:
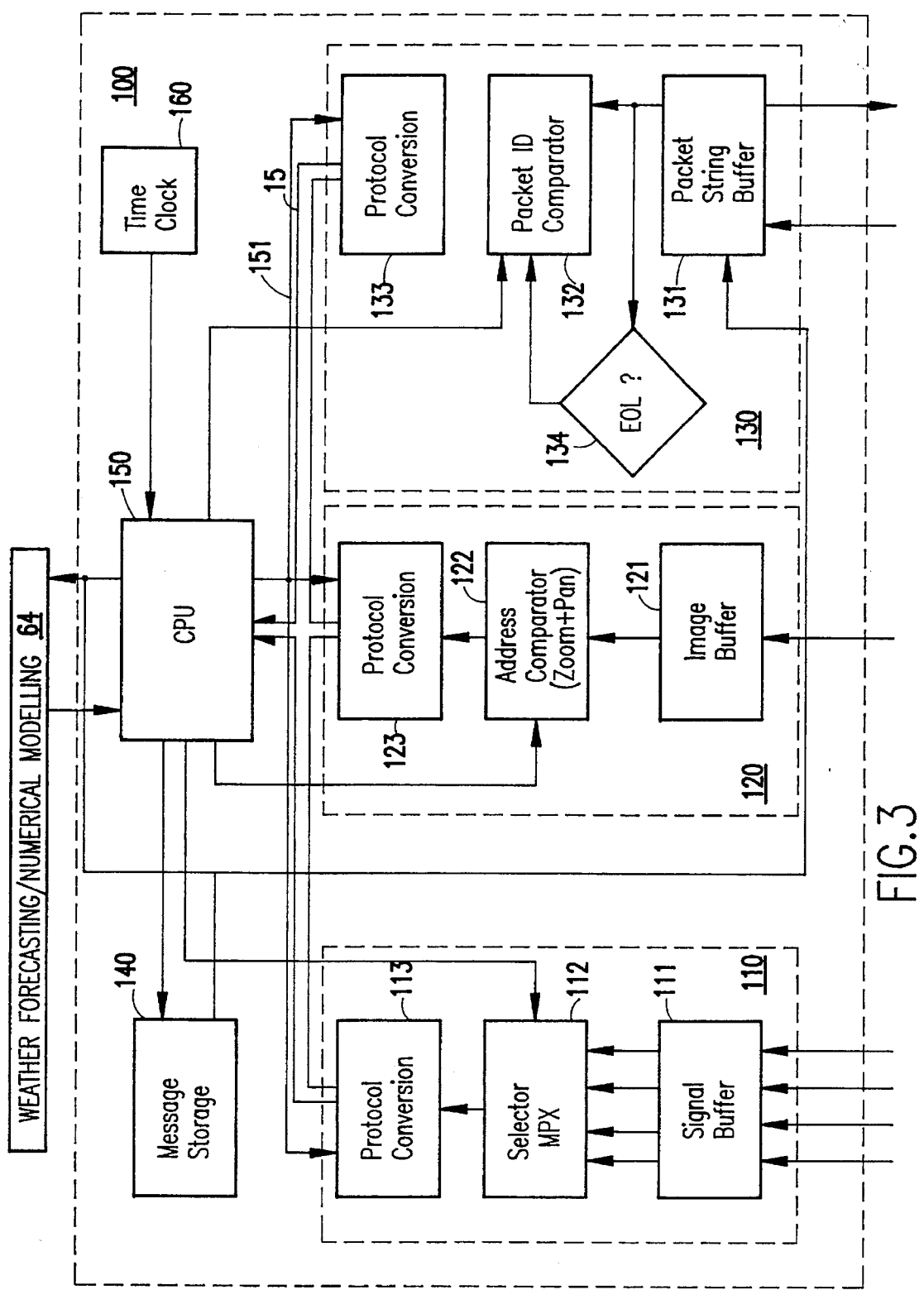
FIG. 3 is a schematic illustration providing an overview of the data collection subsystem of FIG. 2.

As an overview of an important feature of the present invention, reference will now be made to FIG. 3 which shows the basic organization of the data collection subsystem 100. The reduction of data to levels manageable by a meteorological workstation of reasonable cost and processing power as well as the limitation of data to that which the meteorological workstation operator considers to be relevant is accomplished by providing intelligent control (e.g. an autonomous processor 150) for the data collection subsystem 100 in order to select only the desired data from a plurality of raw or processed data streams. This processor receives commands through the weather forecasting and numerical modelling subsystem 64 in response to user inputs at the user input subsystem 61 as coded by the user interface subsystem 62, as shown in FIG. 2.

To accomplish this function, each of the communication subsystems (e.g. asynchronous subsystem 110, synchronous subsystem 120 and telecommunication subsystem 130) are each provided with a data buffer (111, 121, 131, respectively) for storing a group of data such as a string of digital packet as commonly used in the telecommunications industry or an image frame. A selector (112, 122, 132, respectively) is provided in each data path for selecting a portion or the entirety of the data in the respective buffers. Also, for each path, a protocol conversion arrangement, such as a digital-to-digital code converter and clocking and/or addressing in accordance with signals over connection 151 to synchronize communications over bus 15.

It is to be understood that each of these buffers, selectors and protocol converters are specifically adapted in either software or hardware to the type of data they are to process, For example, signal buffer 111, being intended for direct input from a plurality of local transducers, will preferably be provided with a plurality of parallel inputs and may include analog-to-digital converters if such converters are not included in the transducing instruments. Address comparator 122 preferably contains logic to access addresses in order along scan lines within predetermined ranges delimited by addresses input to address comparator 122. Similarly, for telecommunications data, an address or identification comparison will provide for access to the beginning of a data stream which will be extracted until an end-of-line (EOL) signal embedded in the data is detected at 134 and which indicate the end of a particular data line (or image scan line in radar image data, for example). The meteorological workstation can thus begin data extraction at a particular latitude and longitude location in an input image scan line and read a specified number of horizontal image scan lines or portions thereof. Appropriate arrangements for protocol conversions, if not readily available in the art, will be evident to those skilled in the art from the format of data in each channel and the protocol utilized on bus 15, the particulars of which are otherwise unimportant to the practice of the invention.

The data collection subsystem also preferably includes, as a perfecting feature thereof, a message storage unit 140 for providing messages to be overlaid on the screen of the meteorological workstation and/or sent out to other connected systems through the telecommunication subsystem interface (e.g. by insertion into the bit stream at buffer 131) under conditions determined by the user of the meteorological workstation. In this manner, for example, weather advisories and warnings may be automatically issued even when the meteorological workstation is unattended upon the occurrence or coincidence of conditions specified by the user. In this connection, time clock 160 is also preferably provided so that instructions may be executed by CPU 150 at time determined by a user of the meteorological workstation, such as the issuance of periodic reports or alteration of data selected on the basis of geographical region and/or time, such as deselecting visible (as distinct from infrared or other non-visible spectrum) images between sunset and sunrise at a location or region when useful data is not anticipated.

Figure 4:
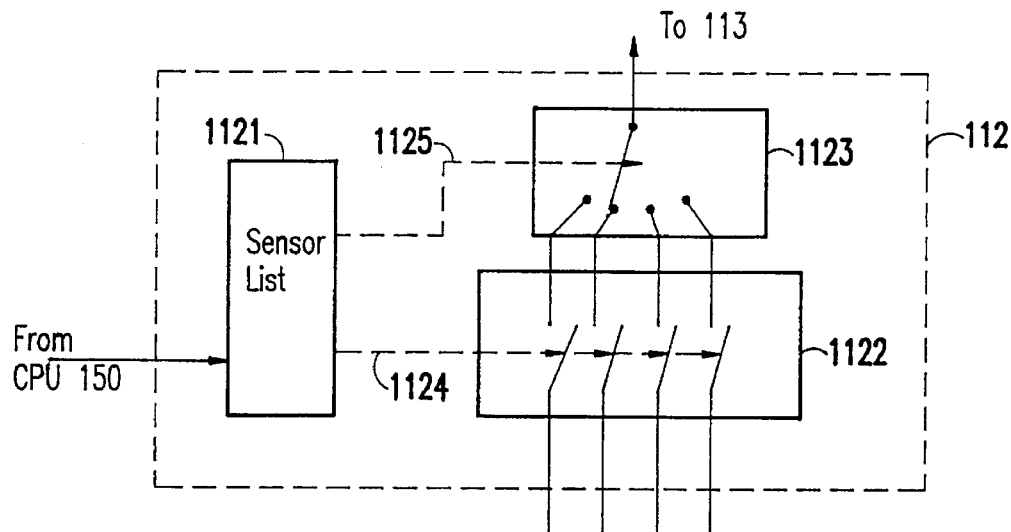
FIG. 4 is a schematic representation of an exemplary arrangement for selection of transducers and asynchronous collection of data therefrom in accordance with the invention.

The asynchronous group 110 is intended to include principally local data collection devices such as transducers for precipitation, dew point, humidity, temperature, wind speed and direction and barometric pressure. Local doppler radar devices such as so-called atmospheric profilers which are small, ground-based, upward pointing fixed beam radar devices would be appropriate for inclusion in this group. The transducers of this group are considered dedicated to the workstation (although an arrangement could be employed to transmit the data or automatic advisory or forecast messages to other locations or to a network or reporting service as indicated by the double arrows for the telecommunication subsystem 130) and are accessible at any time at the will of the workstation operator by means of a simple multiplexing or switching arrangement such as that schematically shown in FIG. 4 and which can be implemented in hardware or, preferably, software, such as by specification of input port(s). In this exemplary embodiment, a register 1121 is provided for holding identification data for transducers or sensors which are currently selected (or deselected). This identification data is selectively decoded to control transmission gates 1122, schematically depicted as switches, for connecting individual sensors or transducers to a multiplexer 1123 for serializing the signals for protocol conversion and connection to data bus 15. Time slot assignment, schematically depicted at 1125 is preferably coordinated with sensor selection schematically depicted at 1124.

Figure 5:
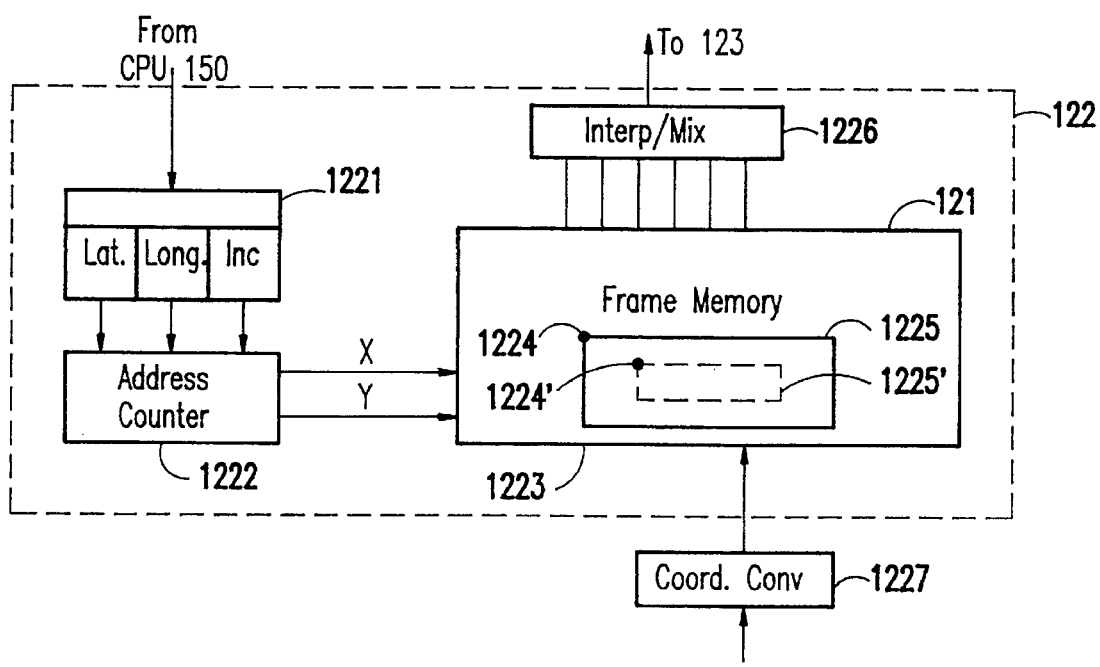
FIG. 5 is a schematic representation of the editing of data gathered over telecommunications links such as station profile data in accordance with the invention.

Synchronous subsystem 220 is schematically depicted in greater detail in FIG. 5. The principal data source for this synchronous system will be satellite imagery which will generally be in a full hemisphere format of high resolution, as discussed above. If necessary, remapping of data to rectangular coordinates corresponding to longitude and latitude may be performed at 1227. As indicated above, a single frame of a hemispherical image for a single wavelength range will have a size of about 24 Megabytes. After extraction of data from the satellite data, the frame of image data operated upon by the meteorological workstation in accordance with the invention will preferably have about 1 Megabyte of data. Therefore, frame memory 1223 should have at least a 1 Megabyte capacity and should be double buffered.

For control of data truncation and extraction from an image frame stored in frame memory 1223, a register 1221 is provided to hold a specification of, preferably, the latitude and longitude coordinates (or other orthogonal coordinates by which the display frame is indexed) of an index of the window (e.g. 1224) to be extracted and a pixel increment (e.g. correlating the cells of the frame memory with the pixels of the display) or other window size parameter. This window size parameter controls how many cells of memory are represented by one pixel of the meteorological workstation display or how many pixels of the display are to represent one cell of the frame memory. These parameters control the accessing of cells of the frame memory in a raster sequence by address counter 1222 and can access a plurality of cells in parallel with interpolation or mixing of signals at 1226 when the detail available in the frame memory is greater than can be produced by the display (e.g. when the window covers a large geographical area). Thus, change of the window size parameter provides a zoom function (e.g. changing the field of view from 1225 to 1225') in preliminary image processing and reduces data to the volume which can be reproduced by the meteorological workstation, thus reducing the data which must be further processed by the workstation processor 63 and application 64.

It is preferred, however, to extract a data window somewhat larger than the final zoom level. This is accomplished by issuing commands to change the window of extracted data only upon a repetition of a zoom operation by the user and performing zooming by performing zooming by clipping data within the extracted window of data. Panning is thus preferably accomplished more simply by alteration of clipping addresses (e.g. 1224 to 1224') within the window of extracted data. Thus, in effect, the operator is able to roam over the window of extracted data with a zoomed window which is smaller that the window of extracted data. If a clipping address then exceeds the bounds of the extracted window, a command is issued to CPU 150 to expand or, preferably, shift the window of extracted data.

The telecommunication subsystem 130 is intended to provide a common interface and convenient communication medium for all other data which the user of the meteorological workstation may wish to procure. At the present time, various commercial services provide many different forms of data on a periodic or continuous basis such as national atmospheric and oceanographic data and forecasting. Station profile reports and doppler radar data is also conventionally communicated over telephone lines. These communications are preferably done digitally and in conformance with telecommunication industry standards.

In accordance with these standards, the data is typically formed into packets and will have a prefix 1321 to identify the data (e.g. location of a station transmitting a station profile), a string of data packets and a termination (EOL) code. The telecommunication selector 132 which may be implemented in hardware or, preferably, software (at least in part), is schematically shown in greater detail in FIG. 6. Specifically, selection from the stream of data which is transmitted to the meteorological workstation and temporarily stored in memory 131 may be searched (e.g. in order of arrival) by comparison of prefixes against a list or other specification of data identification generated by the user or application 64 under user control. When a comparison of a prefix 1321 with an entry in list 1322 is successful, the telecommunication signal is read out in order from the memory to protocol converter 133 and thence to CPU 150 and processor subsystem 63 over bus 15 for storage and manipulation by application 64. The end of the packet stream corresponding to a particular prefix is preferably found by direct detection of an EOL signal which terminates extraction of data, as schematically depicted by the inverting input to gate 1324, and causes resumption of the search of incoming data.

In addition, the telecommunication subsystem preferably includes a packet encoder 1326 which is, itself, well understood in the art for transmitting prearranged messages under control of CPU 150 upon detection of certain preselected conditions. These preselected conditions may also include time as provided by time clock 160 for production of periodic reports, such as a station profile of data collected over asynchronous subsystem 110 from local transducers, which are input to the meteorological workstation, as discussed above, even when the meteorological workstation is unattended.

Figure 6:
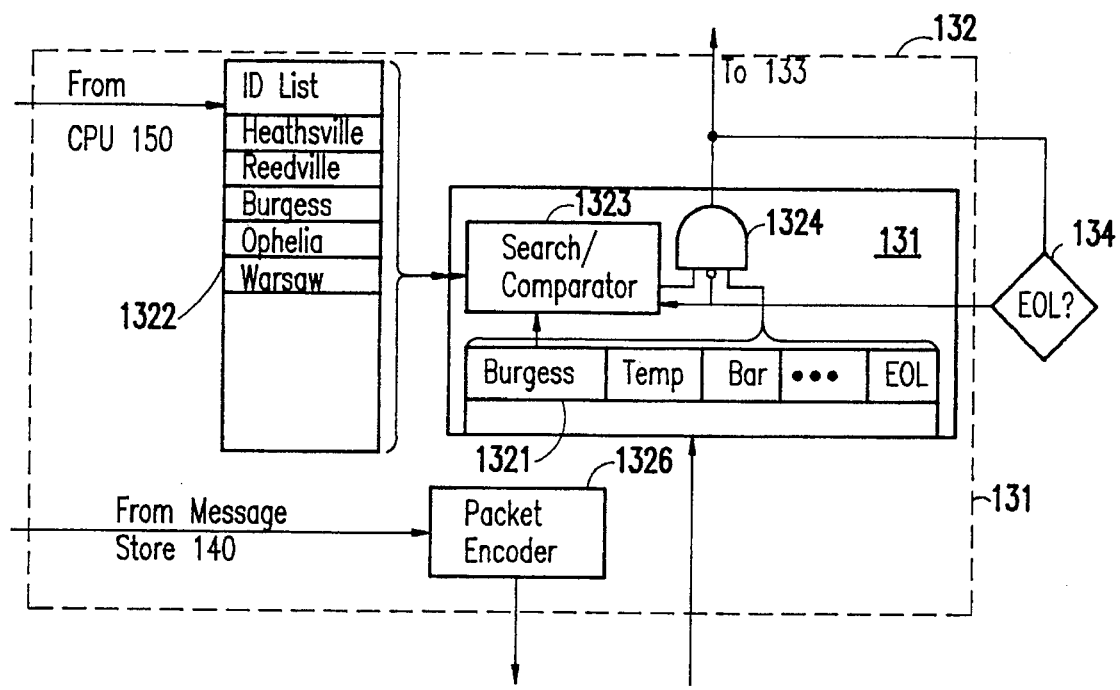
FIG. 6 is a schematic representation of the editing of image (e.g. radar or satellite imagery) in accordance with the invention.
Figure 7:
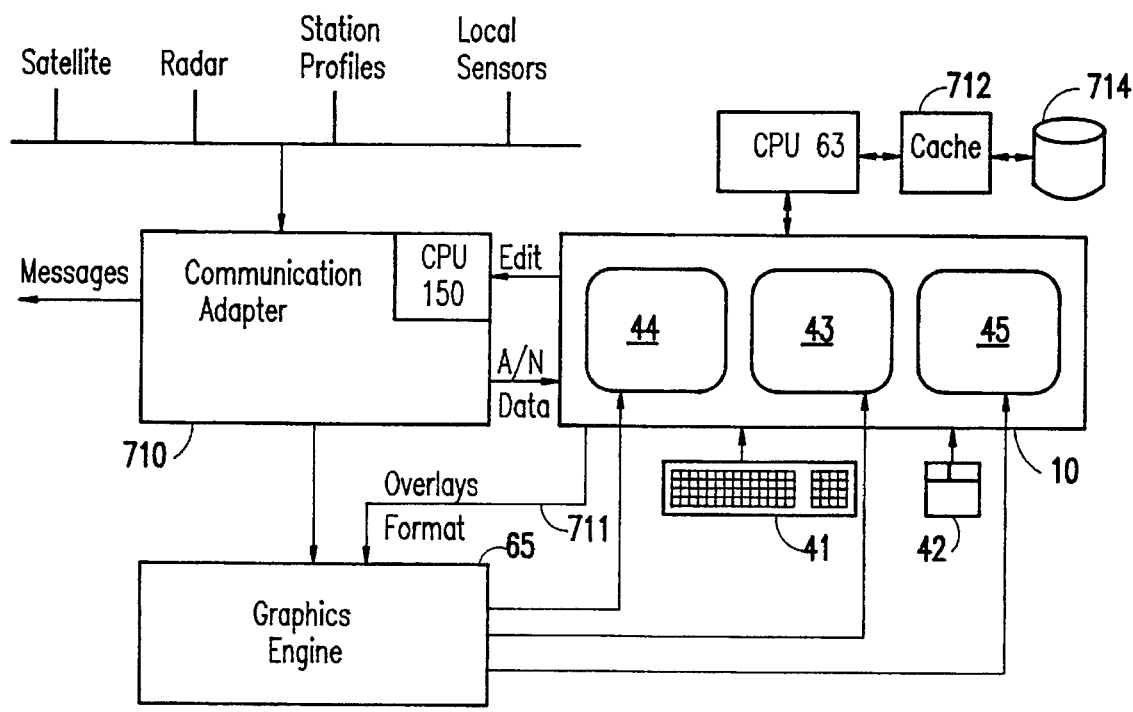
FIG. 7 is a schematic representation of the manner in which data editing and source control is performed in accordance with the present invention.

Referring now to FIG. 7, the integration and operation of the meteorological workstation in accordance with the invention will now be discussed. The asynchronous, synchronous and telecommunication subsystems 110, 120 and 130, having been discussed in detail above, are collectively illustrated in the preferred form of a communication adapter 710 having a dedicated processor 150 therein. This section of the system is preferably embodied by a communication adapter or interface card which can be installed, for example, in main processor subsystem 63. Data is provided to the communication adapter 710 in the manner discussed above in regard to FIG. 1. Data editing commands are generated by the user interface (62 of FIG. 2) in response to user inputs from keyboard 41 and pointer device 42. These commands will principally be in the form of commands to change the contents of selection registers 1121 (FIG. 4), 1221 (FIG. 5) or 1322 (FIG. 6) in order to change the search or selection criteria controlling the extraction of data from the input data stream or streams. Thus most of the editing function of graphical, numerical and alphanumerical data from one or more data sources 20 is done by truncation of input data. The amount of data to be processed is thus limited to the current needs of the user at any time. This limitation of data is particularly important for graphical data which can be of relatively high volume for a single frame as provided by an image source. Further, since the extraction of graphic information is indexed to a particular location or geographical area, as extracted from the data stream and forwarded to the graphics engine 65, graphical and/or alphanumerical overlays are properly registered with the graphic images by reference to the screen raster of any of displays 43, 44 and 45 and no significant additional processing is required to achieve such registration.

Figure 8:
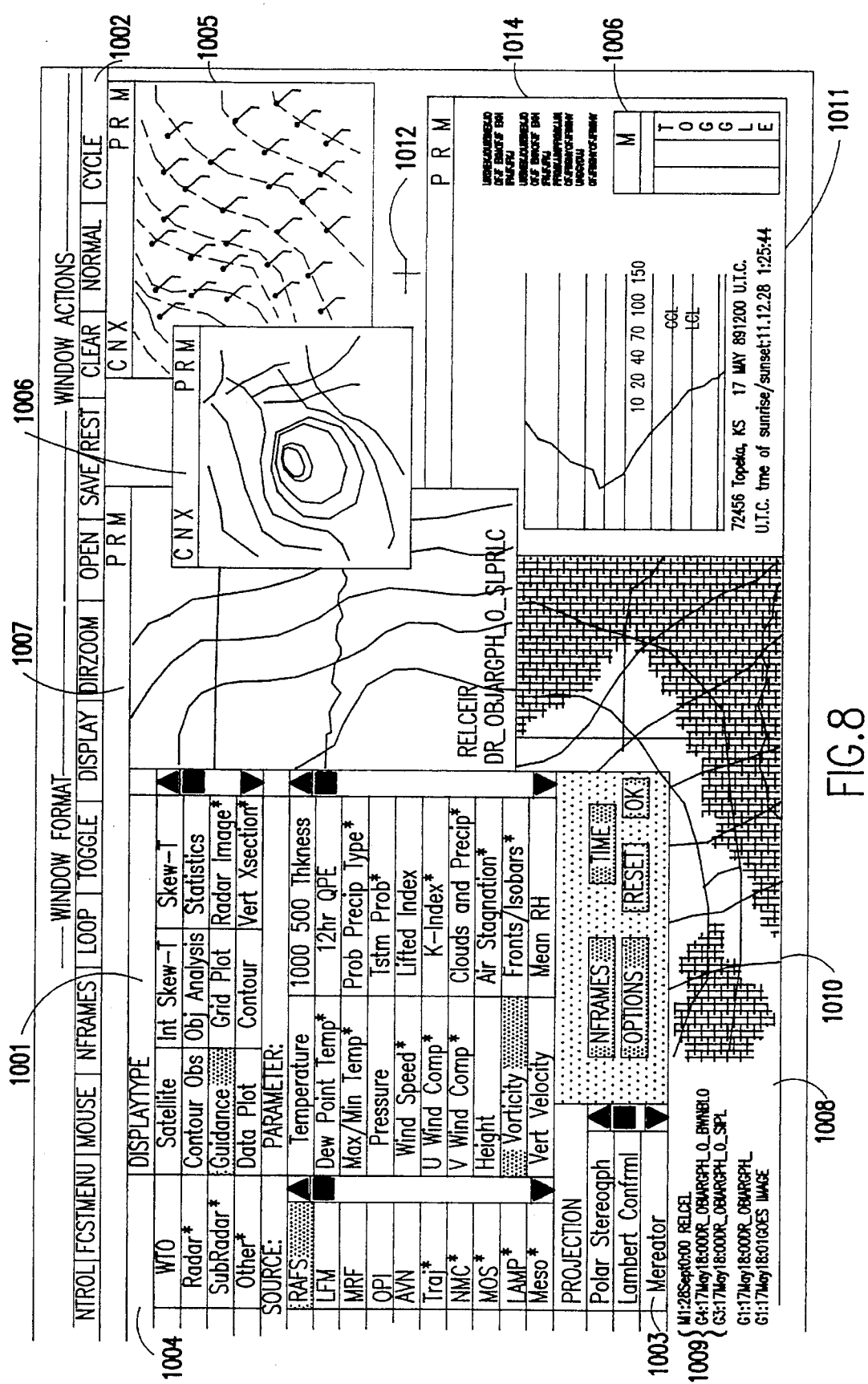
FIG. 8 is an exemplary form of display generated by the meteorological workstation in accordance with the invention.

The communication adapter 710 also separates and directs alphanumerical data (e.g. station profiles, radar data and other data principally from the asynchronous and telecommunication subsystems 110, 130) from graphical (e.g. satellite imagery) data and forwards it directly to the meteorological workstation and processor 63 thereof in which it will be processed in accordance with the weather forecasting and numerical modelling applications for forming contour (1010), wind speed (1005) and other types of overlays shown in various windows of the display as depicted in FIG. 8. This direction of data also facilitates the monitoring of user specified conditions for the generation and transmission of messages stored or partially stored (e.g. in the form of a format into which selected data is inserted) in message storage element 140. Other alphanumerical data may be directly displayed in a selection window such as 1011 or 1014 of FIG. 8 and then superimposed as text on an image as has been done at 1009. Data can be deleted from the processing at either the selection window or after it has been located on the display. An example of this would be when anomalous or erroneous data is present among other data which are being located on a display and contours such as isothermal or isobaric contours are being drawn therefrom by application 64. Erroneous data will usually appear, in such a display as a closed contour referred to as a sink or source. Particularly for isothermal contours (and for geographically small closed isobaric contours) closure of a contour will generally indicate erroneous data which can then be deleted from the display as well as the processing. control of the display to delete data is accompanied by a command from the command set embedded in application 64 to processor 150 for control of extraction of data. Thus, erroneous data is entirely removed from the meteorological workstation system.

The location for superposition of the overlay may be controlled with pointer device 42. These overlays are provided in graphical form to graphics engine 65 over connection 711 of FIG. 7 which develops the data for formation of the image on a selected one of displays 43, 44, 45 or a window thereof. During manipulations by the operator, processor 63 stores the final graphical data or portions thereof in cache 712 from which it can be retrieved at high speed, particularly for purposes of animation of weather image sequences which must be replayed at a minimum of ten frames per second. However, when immediate playback is not required, images and sequences of images may be stored on hard disk or mass storage 714 and later retrieved to cache 712 when needed. Logging of data and the addition of graphics images and models may also be accumulated in the same fashion and addressed in a content addressable manner.

As indicated above, the application 64 will also preferably provide a plurality of pull-down menus which can be selected from the selection row 1002 by the pointer device 42 in connection with cursor image 1012 or keyboard 41. Currently selected functions of the pointer device are preferably displayed in a mouse function menu 1006. Selection of a pull-down menu will result in a menu of the form exemplified at 1001 which indicates and allows control of the geographical map projection (1003), data sources (1004) and similar command functions which, while actually achieved through selective data editing in most cases, appear to the operator as if control were being exerted over the data source, itself. Of course actual control of data sources could, in fact, be carried out, for example by transmission of a command message over the telecommunication subsystem as shown in FIGS. 3 and 6. Each window (e.g. 1006) also is provided with a menu bar (e.g. 1007) which directly allows a window to be brought to the foreground, storage, erasure and other functions, as may be desired. These functions can be freely customized within application 64.

In view of the foregoing, it is seen that the invention provides a meteorological workstation in which data is reduced by editing of raw or processed data at the input thereto. The meteorological workstation provides for processing of graphical images and overlaying graphical and/or alphanumeric images thereon as well as the assembly of such images into an animation sequence or side-by-side comparison on selectable screens of a multi-head workstation console. The meteorological workstation allows not only the deletion of selected data from the display but from the workstation system and data processing application. Further, the meteorological workstation provides the appearance and effect of control of data sources by selective editing of data at the input to the system. Selected weather conditions can also be monitored, even when the meteorological workstation is unattended, as specified by the operator for the purpose of automatically generating and transmitting prearranged messages, reports advisories and warnings to other stations or weather services. Further, by virtue of the ability to receive and process raw data as it is gathered, the timeliness and accuracy of forecasting by the meteorologist can be greatly improved since the data collected will be more nearly concurrent and directly available to the meteorologist without processing by weather reporting services.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A workstation for analysis and manipulation of data, including graphical data, selected from a data stream from at least one source in response to user input, said workstation including a workstation processor means for executing commands in response to said user input for manipulating said selected data, means for supplying said data to said workstation processor including a communication adapter for receiving said data stream from said at least one source and selecting at least a portion of said data stream, and an autonomously operating processor means for maintaining a specification of data requested from said data stream by said workstation processor and controlling extraction of data from said data stream received by said communication adapter to supply said selected portion of said data stream to said workstation processor.

2. A workstation as recited in claim 1, wherein said at least one source includes a plurality of inputs and said means for supplying said data to said workstation processor includes means for selectively connecting and disconnecting ones of said plurality of inputs to said workstation.

3. A workstation as recited in claim 2, wherein at least one of said plurality of inputs includes a transducer for measurement of a physical parameter.

4. A workstation as recited in claim 2, wherein at least one of said plurality of inputs is a meteorological condition transducer.

5. A workstation as recited in claim 1, wherein said at least one source includes a source of a frame of image data and said means for supplying data to said workstation, and wherein said workstation further includes means for extracting a display frame from said frame of image data.

6. A workstation as recited in claim 5, wherein said frame of image data is indexed to a system of orthogonal coordinates.

7. A workstation as recited in claim 6, further including means for conversion of indices of said frame of image data to indices of another system of orthogonal coordinates.

8. A workstation and recited in claim 6, including means for storing at least one coordinate address and means for comparing said at least one coordinate address with an index of said system of orthogonal coordinates.

9. A workstation and recited in claim 7, including means for storing at least one coordinate address and means for comparing said at least one coordinate address with an index of said another system of orthogonal coordinates.

10. A workstation as recited in claim 1, wherein said at least one source includes a source of a plurality of signals containing respective identification codes, and wherein said workstation further includes means for selecting ones of said plurality of signals in accordance with said identification codes.

11. A workstation as recited in claim 1, wherein said at least one source includes a source of a plurality of signals containing respective identification codes, and wherein said autonomously operating processor maintains said specification of data as a list of one of said identification codes, wherein said means for supplying data to said workstation further includes means for comparing respective ones of said identification codes with entries in said list.

12. A workstation as recited in claim 11, further including means, responsive to said means for comparing respective ones of said identification codes with entries in said list, for extracting a data string from said data from said data source delimited by said identification code and a termination signal.

13. A workstation as recited in claim 1, wherein said means for supplying data to said workstation further includes a protocol converter.

14. A workstation as recited in claim 1, wherein said communication adapter includes selector means for storing the specification of data as search or selection criteria controlling the extraction of data from said data stream.

15. A workstation as recited in claim 14, wherein said autonomously operating processor responds to editing commands from said workstation processor to change the search or selection criteria stored in said selector means in response to user inputs.

16. A workstation as recited in claim 1, wherein said communication adapter includes buffer storage means for transiently storing a portion of said data stream, and said autonomously operating processor means extracts said selected data from said buffer storage means of said communication adapter.

17. A method of operating a workstation having a workstation processor, said method including the steps of transmitting a data stream to a communication interface and storing said data stream therein, controlling an autonomous processor from said workstation processor to maintain a specification of data of interest requested from said data stream by said workstation processor, extracting said data of interest within said data stream stored at said communication interface by said transmitting and storing step in accordance with said specification of data of interest, and applying said data of interest extracted by said extracting step to said workstation processor.

18. A method as recited in claim 17, wherein said controlling step includes the further step of generating a command to said autonomous processor in response to execution of a data manipulation command in said workstation processor.

19. A method as recited in claim 18, wherein said command in said workstation processor is a graphic image manipulation command.

20. A method as recited in claim 18, wherein said command in said workstation processor is a graphic image overlay command.

21. A communications interface including means for receiving and storing a data stream from at least one source, an autonomously operating processor means for maintaining a specification of data of interest within said data stream from said at least one source and means for extracting selected data from said data stream received by said communication interface in accordance with said specification of data of interest.

22. A communication interface as recited in claim 21, wherein said means for extracting data includes means for accepting data from an input port identified by said specification of data of interest.

23. A communication interface as recited in claim 21, wherein said means for extracting data includes means for comparing addresses within said data received by said communication interface with an address contained in said specification of data of interest.

24. A communication interface as recited in claim 21, wherein said means for extracting data includes means for comparing an identification code within said data received by said communication interface with a code contained in said specification of data of interest.

\* \* \* \* \*